United States Patent [19]

Haisma et al.

[11] Patent Number: 4,679,892

[45] Date of Patent: Jul. 14, 1987

[54] COMPONENT FOR AN INTEGRATED OPTICAL SYSTEM

[75] Inventors: Jan Haisma; Pieter van der Werf, both of Eindhoven; John M. Robertson, deceased, late of Eindhoven; by Freidrich J. de Haan, administrator, Dommelen, all of Netherlands

[73] Assignee: U.S. Philips Corporation, New York, N.Y.

[21] Appl. No.: 658,109

[22] Filed: Oct. 5, 1984

[30] Foreign Application Priority Data

Oct. 7, 1983 [NL] Netherlands .................. 8303446

[51] Int. Cl.⁴ ............................................. G02B 6/12
[52] U.S. Cl. ................................. 350/96.12; 350/96.34
[58] Field of Search .............. 350/96.11, 96.12, 96.34, 350/96.13, 96.14

[56] References Cited

U.S. PATENT DOCUMENTS

| | | | |
|---|---|---|---|
| 3,990,059 | 11/1976 | Carlo et al. | 350/96.15 |
| 3,990,777 | 11/1976 | Auracher | 350/96.15 |
| 4,099,836 | 7/1978 | Baues et al. | 350/96.34 |
| 4,136,350 | 1/1979 | Tien | 350/96.14 |
| 4,153,329 | 5/1979 | Gillette | 350/96.13 |

OTHER PUBLICATIONS

Chang, H., *Magnetic Bubble Technology: Integrated Circuit Magnetics for Digital Storage and Processing*, IEEE Press Selected Reprint Series, N.Y., 1975, pp. 111-116.

*Primary Examiner*—John Lee
*Attorney, Agent, or Firm*—Marc D. Schechter

[57] ABSTRACT

Component for an integrated optical system, in particular for guiding electromagnetic radiation in the visible and/or infrared wavelength range. The component comprises a monocrystalline substrate of a material having a garnet structure and a refractive index $n_1$. A dielectric layer having a refractive index $n_2$ ($n_2 < n_1$) is grown epitaxially on a surface of the substrate. An optical waveguide layer having a refractive index $n_3$ ($n_3 > n_2$) is grown epitaxially on the dielectric layer.

8 Claims, 4 Drawing Figures

COMPONENT FOR AN INTEGRATED OPTICAL SYSTEM

BACKGROUND OF THE INVENTION

The invention relates to a component for an integrated optical system, in particular for guiding electromagnetic radiation in the visible and/or infrared wavelength range. The component comprises a monocrystalline substrate of a material having a garnet structure and a refractive index $n_1$. The substrate is provided with a monocrystalline optical waveguide layer of refractive index $n_3$.

Components for integrated optical systems require monocrystalline optical waveguide layers which may serve as (passive) optical waveguides or as active layers in electrooptical or magnetooptical devices. Optical waveguide experiments are described in *Magnetic Bubble Technology: Integrated Circuit Magnetics for Digital Storage and Processing*, edited by H. Chang (IEEE PRESS Selected Reprint Series, New York, 1975, pp. 111-116) in which light waves in the wavelength range between 1 and 5 μm were propagated in $Eu_3Ga_5O_{12}$ layers which had been grown epitaxially on $Gd_3(Sc_2Al_3)O_{12}$ substrates. Experiments are also described which relate to the switching and modulation of radiation of a He-Ne laser in a magnetooptically active waveguide which comprised a $Y_3(Ga_{1.1}Sc_{0.4}Fe_{3.5})O_{12}$ layer (n=2.1) grown on a $Gd_3Ga_5O_{12}$ substrate (n=1.94±0.02).

In order to be able to conduct light, the waveguide layer must have a refractive index which is higher than that of the material surrounding the layer. This is achieved in the known (passive) optical waveguide in that an $R_3Ga_5O_{12}$ layer (n=1.94±0.02) is grown on an $R_3(Sc_2Al_3)O_{12}$ substrate (n=1.87±0.02), where R represents a rare earth metal ion.

A first disadvantage of the known device is that $R_3(Sc_2Al_3)O_{12}$ has to be used as the substrate material. $Gd_3Ga_5O_{12}$ cannot be used as a substrate because its refractive index (n=1.945) is too high with respect to the other waveguide layer $R_3Ga_5O_{12}$ materials. $Gd_3Ga_5O_{12}$ is presently the only garnet single crystal of a high-grade physical-optical optical quality which can be grown by the Czochralski method on a scale suitable for mass production.

A second disadvantage is that the difference between the refractive indices of the waveguide layer and of the substrate is comparatively small, so that the ability to contain light within the layer is not optimum.

With regard to the known magnetooptically active waveguide, the disadvantages mentioned above either do not exist or are less severe. However, the use of $Y_3(Ga_{1.1}Sc_{0.4}Fe_{3.5})O_{12}$ as a material for the magnetooptically active layer has the disadvantage that the existing magnetic and magnetooptical properties, the optical absorption and the lattice constant of the material must be acceptable.

SUMMARY OF THE INVENTION

It is the object of the invention to provide a way out of the above-mentioned impasse. For that purpose a component for an integrated optical system has a dielectric layer with a refractive index $n_2$ ($n_2 < n_1$). The dielectric layer is grown epitaxially on a surface of the substrate, and the optical waveguide layer of refractive index $n_3$ ($n_3 > n_2$) is grown epitaxially on the dielectric layer.

The invention provides a substrate having an improved interface. As a result, on the one hand $Gd_3Ga_5O_{12}$ can be used for the substrate in combination with $R_3Ga_5O_{12}$ waveguide layers in passive waveguide components. On the other hand, it is possible by varying the composition of the waveguide layer material to produce the properties of the waveguide layers in (magnetooptically active waveguide components having the properties required for specific applications.

A preferred form of the component according to the invention has a $Gd_3Ga_5O_{12}$ substrate. The intermediate dielectric layers consists of a material which has the general composition $R_3Sc_xAl_{5-x}O_{12}$. Wherein R=Y or Gd and $0<x<5$. More particularly the dielectric layer has the composition $Y_3Sc_2Al_3O_{12}$ (n≈1.8). Dielectric layers with this composition have lattice constants matched to the lattice constant of $Gd_3Ga_5O_{12}$.

Because of its high transparency for electromagnetic radiation in the visible and infrared ranges, $Gd_3Ga_5O_{12}$ is a very suitable material for a (passive) waveguide layer. When grown on a dielectric layer of $R_3Sc_xAl_{5-x}O_{12}$ (wherein R is Y or a rare earth metal constituent, in particular Y or Gd), $Gd_3Ga_5O_{12}$ layers have very good waveguide properties due to the comparatively large difference in refractive index between the dielectric and light conductor layers.

DESCRIPTION OF THE PREFERRED EMBODIMENTS

Epitaxially grown rare earth metal-gallium garnet layers have recently been suggested for use in integrated optical systems, for example optical waveguides. Epitaxially grown rare earth metal-iron garnet layers have been suggested for use in modulators and certain nonreciprocal systems, such as insulators, directional couplers and the like.

A special construction of a passive waveguide is a beam splitter.

As is known, optical systems which are formed from single optically isolated fibers are used for transmitting information by light signals. The fibers are connected to another light conductor in a previously determined ordering. In particular in logic systems, it is sometimes necessary when transmitting the information to distribute part of the information-carrying light radiation between various channels. For this purpose a branched light conductor or splitter may be used which is shown in its simplest form in FIG. 3. The following procedure is used to manufacture the FIG. 3 device.

A dielectric layer 2 of $Y_3Sc_2Al_3O_{12}$ (having a thickness of, for example, between 0.1 and 5 μm) is deposited by liquid phase epitaxy on a substrate 1 of monocrystalline $Gd_3Ga_5O_{12}$ (having a thickness of, for example, 200 μm). $Y_3Sc_2Al_3O_{12}$ has a lattice constant which substantially matches to that of $Gd_3Ga_5O_{12}$.

Figure 3:
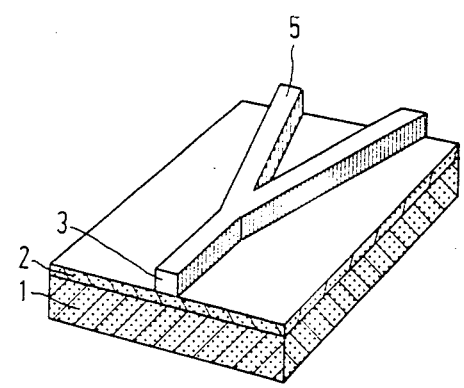

A layer 3 of $Gd_3Ga_5O_{12}$ (having a thickness of, for example, between 1 and 50 μm) is deposited on the layer 2 by liquid phase epitaxy. Layer 3 has a refractive index $n_3$ which is considerably larger than the refractive index $n_2$ of layer 2 ($n_3 = 1.94$ and $n_2 = 1.8$ at a wavelength $\lambda$ of 1.15 $\mu$m) and may hence serve as a waveguide. (FIG. 3.)

Figure 2:
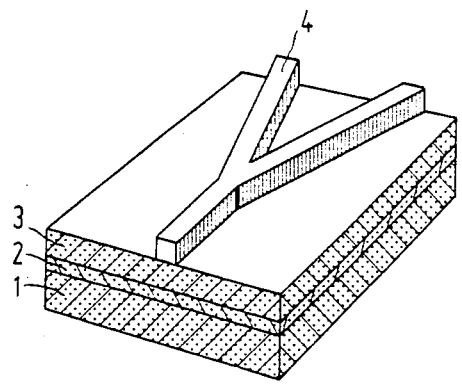

In order to obtain a branch in the layer 3, an aluminum mask 4 is provided on the layer 3 by photolithographic processes. (FIG. 2.) The shape of mask 4 is transferred to the layer 3 by sputtering or reactive ion etching, so that the light conductor structure 5 of $Gd_3Ga_5O_{12}$ remains on the dielectric layer 2. (FIG. 3.) The structure 5 may serve as a beam splitter.

A wet chemical etching process may be used on the layer of FIG. 2 instead of sputtering or reactive ion etching. In that case, the mask 4 should consist of a material which is not corroded by the wet chemical etchant.

Figure 1:
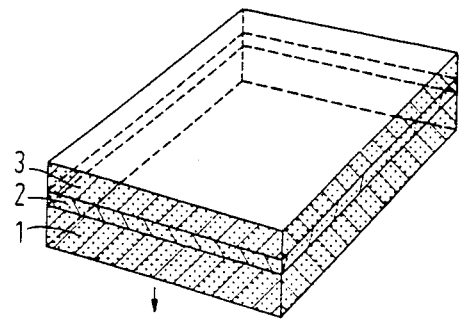
FIGS. 1, 2 and 3 are perspective views of successive steps in a method of making a multilayer light conductor structure according to the invention.
Figure 4:
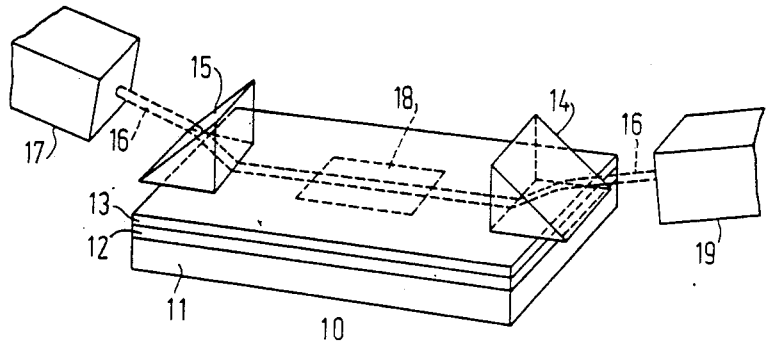
FIG. 4 is a perspective view of a thin film waveguide component according to the invention.

FIG. 4 shows a waveguide component 10. It comprises a monocrystalline substrate 11 of $Gd_3Ga_5O_{12}$ on which a layer 12 of $Y_3Sc_2Al_3O_{12}$ is deposited in a manner analogous to that of FIGS. 1, 2 and 3. A layer 13 of a material having a garnet structure and a higher refractive index than $Y_3Sc_2Al_3O_{12}$ is deposited on the layer 12.

Depending on whether the layer 13 is to be passive or magnetooptically active, the material of the layer 13 is a rare earth metal-gallium garnet or a rare earth metal-iron garnet.

The layer 13 has a thickness which is between 0.1 and 100 times, preferably between 1 and 10 times, the wavelength of the electromagnetic radiation which is guided through the layer 13.

Coupling prisms 14 and 15 couple a beam of radiation 16 into and out of, respectively, the layer 13. The beam of radiation 16 is coherent and has a wavelength in the optical range of the spectrum (which comprises the visible range and the ranges immediately adjoining thereto). The beam of radiation can be generated, for example, by a laser 17 (a He-Ne laser or a Ga-As laser).

In the case when the layer 13 has optically or magnetooptically active properties, the region 18 of the layer 13 can be influenced by an electric or a magnetic field to modulate the beam of radiation 16. The output radiation is applied to a processing device 19.

What is claimed is:

1. A component for an integrated optical system for guiding visible or infrared electromagnetic radiation, said component comprising:
    a monocrystalline substrate of a material having a garnet structure and a refractive index $n_1$, said substrate not being a waveguide;
    a dielectric layer having a refractive layer $n_2$ grown epitaxially directly on the substrate, $n_2$ being smaller than $n_1$; and
    an optical waveguide layer having a refractive index $n_3$ grown epitaxially directly on the dielectric layer, $n_3$ being greater than $n_2$.

2. A component as claimed in claim 1, characterized in that the substrate consists of $Gd_3Ga_5O_{12}$.

3. A component as claimed in claim 2, characterized in that the dielectric layer consists of $R_3Sc_xAl_{5-x}O_{12}$, where R consists of one or more of the group of yttrium and a rare-earth metal, and where $0 < x < 5$.

4. A component as claimed in claim 3, characterized in that R consists of one or more of the group of yttrium and gadolinium.

5. A component as claimed in claim 4, characterized in that the waveguide layer consists of $R'_3Ga_5O_{12}$, where R' consists of one or more of the group of yttrium and a rare-earth metal.

6. A component as claimed in claim 5, characterized in that R' is gadolinium.

7. A component as claimed in claim 3, characterized in that the waveguide layer consists of $R'_3Ga_5O_{12}$, where R' consists of one or more of the group of yttrium and a rare-earth metal.

8. A component as claimed in claim 7, characterized in that R' is gadolinium.

* * * * *